Nov. 9, 1926.
P. G. HOLLSTEIN ET AL
1,605,951
CHOCOLATE PASTE MOLD FILLING MACHINE
Filed Dec. 10, 1920   3 Sheets-Sheet 3
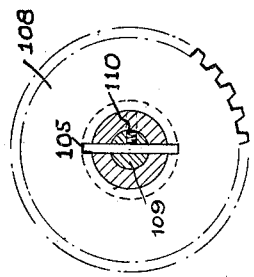
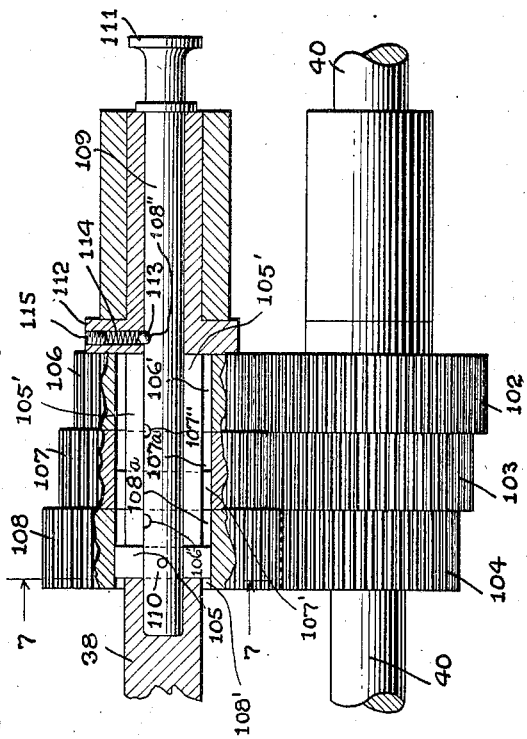
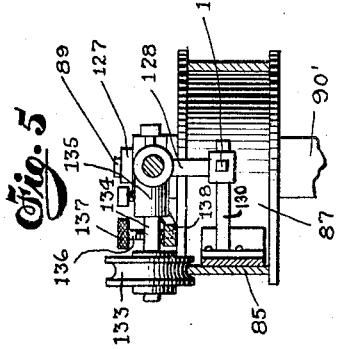
Paul G. Hollstein
Emil V. Rane Inventors
By their Attorneys
Emery, Varney, Blair & Hognet Patented Nov. 9, 1926.

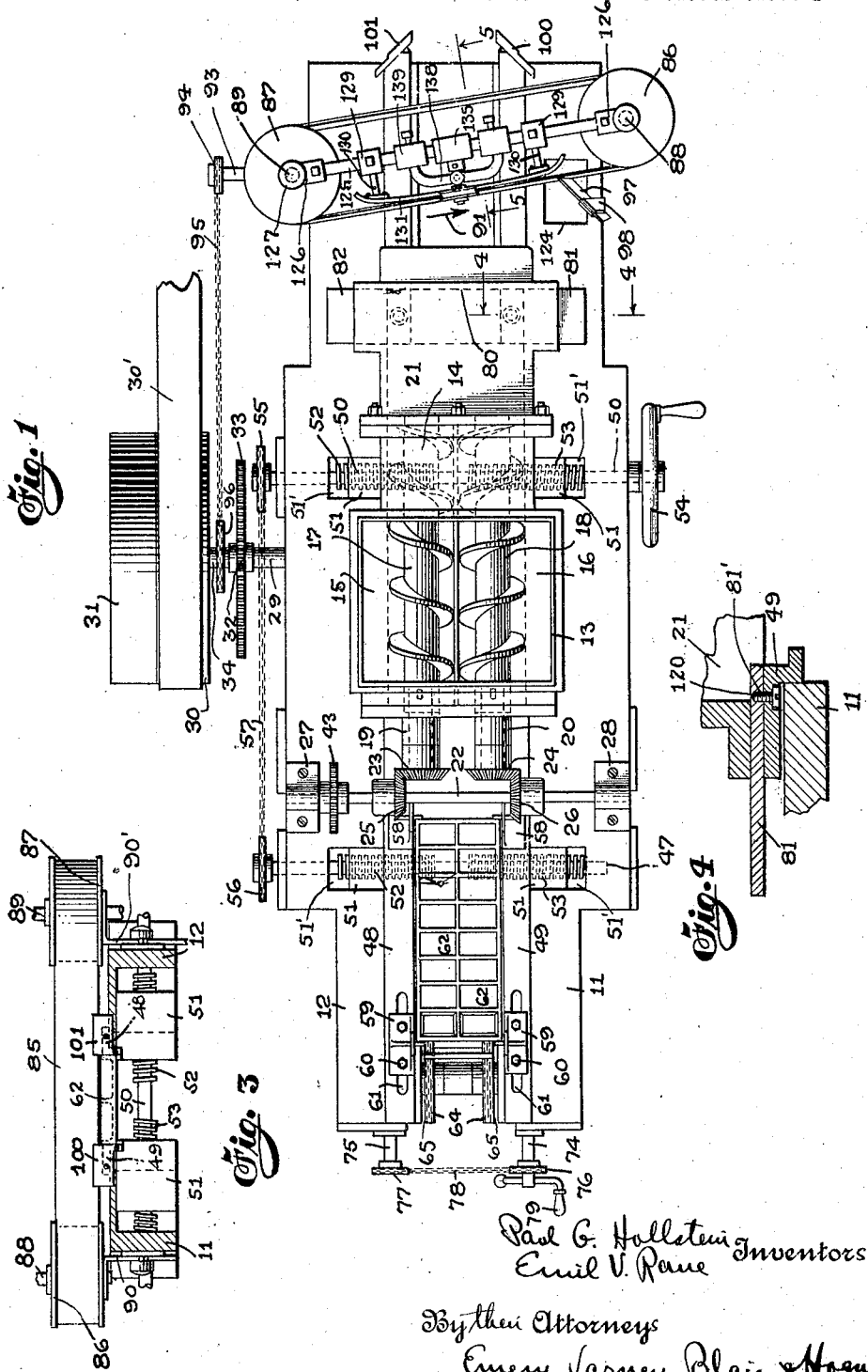

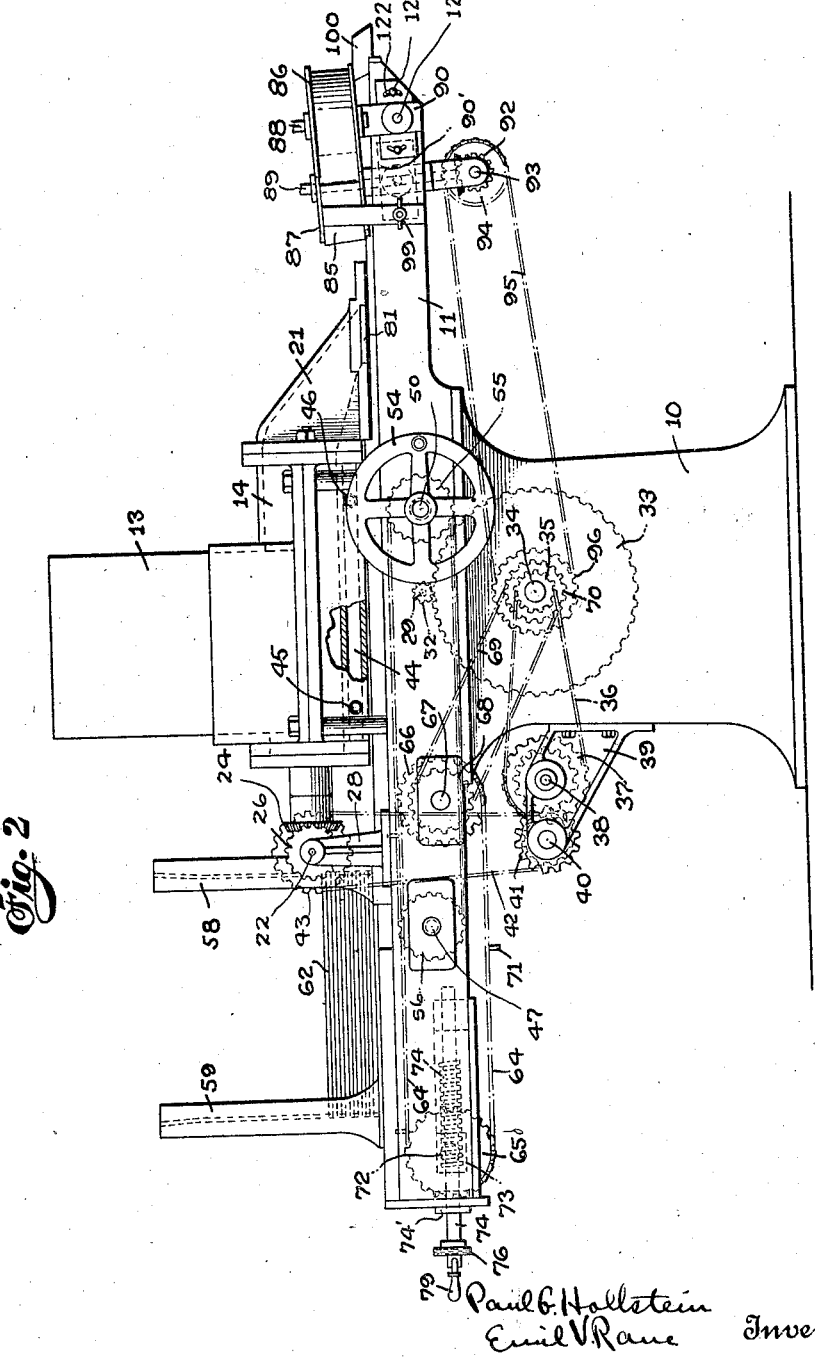

1,605,951

UNITED STATES PATENT OFFICE.

PAUL G. HOLLSTEIN, OF CARLSTADT, NEW JERSEY, AND EMIL V. RAUE, OF NEW YORK, N. Y., ASSIGNORS TO J. M. LEHMANN COMPANY, INC., OF NEW YORK, N. Y., A CORPORATION OF NEW YORK.

CHOCOLATE PASTE MOLD-FILLING MACHINE.

Application filed December 10, 1920. Serial No. 429,604.

This invention relates in general to a machine for molding chocolate paste or like substances.

One of the objects of this invention is to provide a chocolate molding machine of efficient and reliable action and in which the action in forcing the paste into the mold will be uniform and positive. Another object is to provide also a simple and effective means for adjusting the action of the mold-filling apparatus of the machine in accordance with the different consistencies of the chocolate paste operated upon and in accordance with the different volumes of material required to be placed in the molds.

This invention aims also to provide a machine of the above character with mechanism whereby the molds may be accurately filled and whose accuracy of action will be independent of the mold-filling apparatus. Other objects will be in part of this or in part pointed out hereinafter.

A preferred embodiment of the invention has been selected herein for purpose of illustration and description, the same being shown in the accompanying drawings, wherein, Figure 1 is a plan view; and Figure 2 is a side elevation of a mold-filling machine illustrative of our invention, Fig. 2 having certain details thereof broken away for the sake of greater clearness.

Figure 3 is an end view partly in section taken from the right-hand end of Fig. 1, certain parts being omitted; and Figure 4 is a detailed fragmentary view in section taken on the line 4—4 of Fig. 1.

Figure 5 is a sectional view on a larger scale taken on the line 5—5 of Fig. 1, certain parts being omitted.

Figure 6 is a detailed view, partly in section and on an enlarged scale, of the speed change mechanism; and Figure 7 is a sectional view taken on the line 7—7 of Fig. 6.

Referring to the drawings and more particularly to Figs. 1 and 2, it will be noted that there has been provided a base member or standard 10 upon the upper portion of which are mounted two longitudinally extending frame members 11 and 12 rigidly secured thereto and upon which the several mechanisms are suitably mounted. Centrally located upon and bridging the frame members 11 and 12 is the mold-filling apparatus proper, comprising the hopper 13 surmounting the housing 14 and adapted to receive the chocolate paste or other material. The housing 14 is preferably subdivided at its lower portion into a plurality of chambers 15 and 16 suitably machined to present substantially cylindrical interior surfaces within which are adapted to operate the conveyor screws 17 and 18 respectively. Conveyor screws 17 and 18 are mounted within suitable bearings 19 and 20, respectively, at one end of the housing 14 and depend for support at their opposite extremities on the machined cylindrical interior surfaces of the housing 14, within which the conveyor screws are centrally supported by contact therewith of the outer edges of the blades. The two cylindrical extensions of the housing 14 terminate in a nozzle 21 suitably secured to the main housing 14 and forming an extension for guiding the paste or material laterally and downwardly over the succession of molds, as will be more clearly hereinafter described.

The spindles of the conveyor screws 17 and 18, extending through the bearings 19 and 20, respectively, have mounted thereon bevel gears 23 and 24 meshing respectively with bevel gears 25 and 26 driven by the shaft 22, extending transversely of the frame members 11 and 12 rotatably mounted in standards 27 and 28 suitably secured thereto.

A main driving shaft 29 journalled in the standard 10 and provided with tight and loose pulleys 30 and 31, from which the shaft 29 may be driven by means of any suitable source of power connected thereto as by the belt 30', has mounted upon it a pinion 32 meshing with the large gear 33 mounted upon a main jack shaft 34. Shaft 34 is mounted in bearings in the standard 10 and is provided with suitable sprockets from which the several mechanisms in the machine may be conveniently driven. Thus, for example, sprocket 35 on the shaft 34 is connected by means of a suitable chain 36 to the sprocket wheel 37 mounted upon the shaft 38 journalled in brackets such as 39, secured to the standard or base 10 of the machine. The shaft 38, by speed-change mechanism to be hereinafter described, drives the shaft 40 similarly journalled in the brackets 39 and provided with a sprocket wheel 41, which is connected as by means of chain 42 and the sprocket wheel 43 to drive the shaft 22. Hence, by means of the gearing above described, the conveyor screws 17 and 18, having their operating blades spiralled in reverse directions, are rotated in opposite directions to force the material through the cylindrical extensions of the housing 14 and through the nozzle 21, forming an extension thereof, to the molds, as will be made clear hereinafter.

The housing 14 may be conveniently made in sections suitably bolted together as is shown in Fig. 2 and is preferably double walled as shown in section so as to provide a jacket 44 having suitable openings as 45 and 46 at either ends of the housing to provide for the entrance and exit of a heating fluid, such as steam for example, to prevent the material from congealing.

Extending longitudinally of the frame members 11 and 12 and overhanging the inner or adjacent edges thereof, are the rails 48 and 49 adapted to support and guide the chocolate molds into operative relation with the nozzle 21. The rails 48 and 49 are mounted upon the screw shafts 47 and 50 suitably journalled in the main frame members 11 and 12 (see Fig. 3), the screw shafts 47 and 50 having oppositely threaded portions 52 and 53 respectively engaging downwardly extending posts 51 secured to the rails 48 and 49. The posts 51, supporting the rails 48 and 49, extend upwardly through transverse slots 51' in the frame members 11 and 12 to permit of transverse movement of the posts and rails as hereinafter described. The screw shaft 50 is provided with a hand wheel 54 by means of which the shaft 50 may be rotated, which rotation is communicated to the screw shaft 47 by means of the sprockets 55 and 56 mounted upon the shafts 50 and 47 respectively, and connected by means of a suitable chain 57. Thus, rotation of the screw shafts 47 and 50 by means of the hand wheel 54 will operate upon the posts 51 and hence upon the rails 48 and 49 to vary the intervening distance therebetween and to accomodate the guide rails 48 and 49 for various widths of molds. The mold guiding rails 48 and 49 extend throughout the entire length of the machine and underneath the nozzle 21, so that molds carried thereby are brought into proper relation with the nozzle 21.

Rigidly mounted upon the rails 48 and 49 are a pair of vertically extending posts 58 having an angular cross section so as to form a retaining magazine with a second pair of posts 59 slidably mounted upon the rails 48 and 49 as by means of the bolts 60 extending through the slots 61 into the rails. Thus the posts 59 may be moved lengthwise upon the rails 48 and 49 to vary their distance from the fixed posts 58 so that the magazine may accommodate molds of various lengths, the adjustment of the rails 48 and 49 toward or away from one another permitting of the adjustment of the magazine for various widths of molds. Thus for example, a stack of molds 62 is supported within the posts 58 and 59 forming the magazine, the interior engaging surfaces of the posts being in alignment with the laterally guiding surface of the rails 48 and 49. The molds 62 may be provided with suitable pockets or sections into which the material is to be molded as, for instance, into cakes or bars.

A pair of conveyor chains 64 is disposed immediately underneath the stack of molds 62, chains 64 being mounted upon the sprockets 65 and 66 so mounted between the frame members 11 and 12 and underneath the rails 48 and 49 that the path of travel of the upper portion of the chains 64 is substantially parallel with the rails 48 and 49 and with the path of travel of the molds 62. The sprocket wheels 66 are mounted upon a shaft 67 which is driven by means of the sprocket 68 and the chain 69 from the sprocket 70 mounted upon the main jack shaft 34. Thus a series of pairs of projecting studs 71 suitably secured to the links of the chains 64 and spaced apart at intervals substantially equivalent to the length of a mold 62 may engage the lowermost mold of the stack within the magazine and carry it along the rails 48 and 49 in the direction toward the nozzle 21, the studs 71 disengaging from the mold 62 as soon as the latter has passed the sprocket wheels 66, whereupon the succeeding pair of studs 71 will engage the lowermost mold of the stack and advance it and the preceding mold in the direction mentioned. Thus successive molds are caused to travel through the machine by the advancing motion given the last mold which is being operated upon by the studs 71 in the chains 64. Hence, for each length of mold operated upon a separate pair of conveyor chains 64 is provided, such additional conveyor chain having studs 71 secured thereto at intervals corresponding substantially to the various lengths of the molds desired to be operated upon.

In order to accommodate properly such additional chains corresponding to predetermined lengths or sizes of molds, the shaft 72 upon which the sprocket wheels 65 are mounted is journalled in bearings 73 which are provided with internally threaded extensions adapted to receive the screws 74 and 75 rotatably mounted within the ends of the frame members 11 and 12 respectively, collars 74' preventing axial movement thereof. The screws 74 and 75 are interconnected by means of sprocket wheels 76 and 77 and the chain 78 so that rotation of the screw 74 by means of the handle 79 will be communicated to screw 75. Thus the distance between centers of the pairs of sprockets 65 and 66 may be readily varied to accommodate the various chains corresponding to the various lengths of molds desired to be operated upon.

It will be understood that the chains are provided with studs 71 spaced at such intervals as will correspond substantially to the length of a particular mold corresponding to a particular pair of chains, and that if such provision were not made, and a smaller length of mold were to be employed for a given chain, the travel of the molds underneath the nozzle 21 would be interrupted by reason of the delay incurred in the increased distance which a succeeding pair of studs 71 has to travel before engaging the lowermost mold in the magazine. Since the conveyor screws 17 and 18 operate continuously, it is highly desirable that the procession of molds brought into relation with the nozzle 21 be substantially continuous and uninterrupted, and such continuity of movement is made possible for each set of molds of a given size by providing a corresponding set of conveyor chains 64, whose adjustment and accommodation upon the pairs of sprockets 65 and 66 may be readily brought about by the means hereinbefore described.

The nozzle 21 suitably bolted to housing 14 terminates in a substantially rectangularly shaped opening 80 which bridges the guide rails 48 and 49 in such proximity thereto that the succession of molds 62 passing along the rails 48 and 49 will be filled with the chocolate paste during their substantially continuous travel past and underneath the opening 80. Since various widths of molds may be accommodated in the machine as by means of the adjustments of the rails 48 and 49 hereinbefore described in detail, it is essential that the aperture or opening 80 of the nozzle 21 be made adjustable so that a stream of paste will be forced therethrough and into the molds of such width as will correspond to the particular width of mold employed. Accordingly the nozzle 21 is suitably recessed or slotted laterally of the aperture 80 to receive the sliding plates 81 and 82 whose width is substantially equal to the length of the opening 80 in the direction of the travel of the molds. The plates 81 and 82 are thus slidably mounted in the recessed portion of the nozzle 21 and may be moved toward or away from one another to vary the width of the opening 80 to correspond to the width of the particular set of molds operated upon. In order that the adjustment of the aperture 80 of the nozzle may be made automatically to correspond in width to that of a particular set of molds 62, the plates 81 and 82 are made to move with the guide rails 49 and 48, respectively, so that an individual or separate adjustment of the nozzle opening 80 need not be made. In Fig. 4 is illustrated in section on an enlarged scale a preferred construction for causing a simultaneous adjustment of the plates 81 and 82 with the guide rails 49 and 48 respectively upon the adjustment of the latter for a given width of mold. The plate 81 is provided on its under side with an opening 81' which is adapted to receive the upwardly extending end of a screw 120 threaded into and extending through the guide rail 49, the latter being suitably counter-bored to accommodate the head of the screw 120. The opening 81' in the plate 81 does not extend entirely through the plate 81 and serves merely to connect the plate 81 with the guide rail 49, the only threaded engagement of the screw 120 being with the guide rail 49. A like construction is employed for connecting plate 82 with its corresponding guide rail 48. Hence, adjustment of the guide rails 48 and 49, as hereinbefore described, to accommodate various widths of molds 62 will simultaneously adjust the width of the opening 80 of the nozzle 21 by causing a movement of the plates 81 and 82 to an extent corresponding with the movement of the guide rails 49 and 48 respectively.

The employment of two conveyor screws 17 and 18 at the base of the hopper 13 results in producing a substantially uniform pressure throughout the material within the nozzle 21, so that the molds 62 in passing underneath the nozzle 21 and its adjusted aperture 80 are positively and uniformly filled with the paste, the space between the bottom of the nozzle 21 and the guide rails 48 and 49 being sufficient to permit the passage of the molds therethrough.

In order to make up for slight variations in the thickness of the molds 62, it is desirable to permit of a slight movement of the guide rails 48 and 49 with respect to the nozzle 21. It has been found that the resiliency or spring in the guide rails, which are of angular cross section, in an upward direction is sufficient to insure a good contact between the upper part of the molds and the lower part of the nozzle 21. Such relative movement between the guide rails 48 and 49 and the nozzle 21 is not hindered by reason of the connection hereinbefore described between the guide rails 48 and 49 and from their respective cooperating plates 82 and 81, since the screw 120 in the guide rail 49, for example, merely extends into the opening 81' in the plate 81 and is not in threaded engagement therewith.

In order to insure the filling of each section of the molds 62 with the same amount of material or to the same depth, there has been provided a means for positively removing the surplus material extending above the side walls of the sections of the molds 62. This mechanism comprises a scraper in the form of an endless belt 85, preferably of sheet metal, mounted upon the pair of pulleys 86 and 87 suitably flanged to maintain the belt 85 thereon. The pulleys 86 and 87 are rotatably mounted respectively upon stud shafts 88 and 89 supported in suitable bearing brackets 90 and 90′ adjustably mounted upon the frame members 11 and 12. Referring particularly to Fig. 2, it will be noted that the bracket 90 is pivotally mounted on the frame 11, as by means of pin 121, and is provided with arcuate slots 122 which cooperate with bolts 123 to permit of the adjustment of the bearing bracket 90, and hence of the pulley 86, into any desired inclination with the vertical. A similar construction is employed for mounting the bearing bracket 90′ of the stud shaft 89 to the frame member 12. Thus the angular inclination with the vertical of the stud shafts 88 and 89, and hence of the scraper belt 85, may be adjusted to any desired degree, as will be hereinafter more clearly set forth. It will, furthermore, be noted that the bearing brackets 90 and 90′ are so positioned upon their respective frame members 11 and 12 that the scraper 85 in traveling across the rails 48 and 49 and the molds 62 carried thereby makes an angle with the direction of travel of the molds 62. The scraper 85 is caused to travel across the molds 62 in the direction of the arrow 91 (Fig. 1) and is so driven by means of the pulley 87 which is rigidly secured to the stud shaft 89 in turn driven through the bevel gears 92 from the transverse stud shaft 93 rotatably mounted in a downwardly extending portion of the bearing frame 90′. The stud shaft 93 is in turn driven by means of the sprocket 94 and a chain 95 from the sprocket 96 on the main jack shaft 34 of the machine.

The molds 62, in passing underneath the nozzle 21, are filled with the chocolate paste in the manner hereinbefore described and in continuing to pass along the guide rails 48 and 49 pass underneath the scraper 85, which is so adjusted that it contacts with the upper edges of the walls of the various sections of the molds 62 and scrapes off all material which extends upwardly beyond the plane of the tops of such walls. The surplus material thus removed from the molds is carried by the scraper 85 in the direction of the arrow 91 and is removed therefrom by a stationary scraper 97 mounted in a bracket 98 adjustably secured to frame member 11 as by means of the wing nut 99. The material thus removed by the scraper 97 drops through the opening 124 in the frame member 11 and positioned immediately underneath the scraper 97 and may be collected in any suitable receptacle and placed in the hopper 13 without loss. The scraping belt 85 not only conveys away the material collected by it by reason of the movement of the molds past the scraper, but also exerts a direct scraping action in a direction transverse to the path of the molds, such action resulting by reason of the angle made between the paths of the molds and of the scraper.

As hereinbefore noted, the inclination to the vertical of the scraper belt 85 may be adjusted by adjusting the bearing frame members 90 and 90′ which support the stud shafts 88 and 89 respectively, so that any desired horizontal component of the scraping action may be exerted upon the material carried past the scraper 85 by the molds 62. In order to insure the positive action of the scraper belt 85 and to insure that its action will be uniform, means have been provided for positively restricting the path of the scraper 85 to any desired degree necessary for any particular consistency of material acted upon. Thus, referring to Figs. 1 and 5, it will be noted that there has been mounted upon the upwardly extending portions of the stud shafts 88 and 89 a transversely extending bridging member 125 made preferably of material of circular cross section. The bridging member or rod 125 is rigidly secured to the upper end of the stud shaft 88, which stud shaft is stationary and is mounted upon the stud shaft 89 by means of a bushing 126 so as to permit the rotation of the stud shaft 89 therein, a suitable collar 127 being provided upon the upper end of the shaft 89 to prevent motion of the bushing 127, and hence of the rod 125, in a direction along the axis of the shaft 89. A pair of downwardly extending arms 128 are mounted upon the rod 125 by means of the T's 129, the arms 128 being each provided at its lower end with a transverse opening or slot adapted to receive the arms 130, the outer ends of which are secured to a bracing or stiffening member 131 extending in the direction of the scraper 85 and positioned so as to form a support for the lower inside edge of the scraper 85. The set screws 132 serve to lock the brace 131 in its adjusted position. Thus, during the scraping action of the scraper 85, as hereinbefore described, the lower edge thereof will be supported and stiffened against the movement of the material carried by the molds, and the action of the scraper 85 will be maintained positive and uniform throughout wide variations in the consistency of the material operated upon.

In order to prevent the material of the molds from exerting an upward pressure against the scraper 85 so as to raise the latter from its desired cutting or scraping position and thus to impair the accuracy of operation thereof, roller 133 is mounted so as to contact with the upper edge of the scraper 85 and to function to positively restrict the path of movement of the scraping portion of the scraper 85. The roller 133 is mounted upon a stud shaft 134 secured by means of a T 135 to the transverse rod 125 and is positioned substantially centrally with respect to the two guide rails 48 and 49. The T 135 is loosely mounted upon the rod 125 so as to permit the swinging thereof, and hence also to permit the swinging of the shaft 134 with its roller 133 around the rod 125 with respect to the scraper 85 by means of a screw 136 adapted to be operated by means of the hand wheel 137. The screw 136 is in threaded engagement with the stationary stud shaft 134 and has its lower end rotatably secured in any suitable manner in the substantially central portion of a yoke 138 rigidly secured by means of the T's 139 to the transverse rod 125. Thus, by means of the screw 136, the roller 133 may be made to assume any desired adjusted position so as to prevent the upward motion of the scraper 85 in response to the pressure exerted thereupon by the material in the molds, and the roller 133 cooperating with the brace 131, hereinbefore described, serves to positively guide the scraper 85 and to positively restrict its path to any desired adjusted position with respect to the molds 62 so that the removal of the material therefrom is accurately and uniformly brought about. The filling of the molds may thus be accomplished with great uniformity and accuracy. It may be noted also that the brace or reinforcing member 131 and the roller 133, in being mounted upon the transverse rod 125 in turn mounted upon the stud shafts 88 and 89, partake of any adjustment of the inclination of the stud shafts 88 and 89 to the vertical and that hence no separate or individual adjustment of these members is necessary for a given adjustment of the stud shafts 88 and 89. If, however, it is desired to vary the effectiveness of the scraper 85 for a given adjusted inclined position of the stud shafts, such adjustment may be made in the manner hereinbefore described.

The molds in continuing their passage along the rails 48 and 49 clear the inactive side of the scraper belt 85 which, by reason of the inclination given the stud shafts 88 and 89, has its lowermost edge at a sufficient distance above the tops of the molds as to avoid contact therewith. A further movement of the molds 62 passes such molds between the pair of scrapers 100 and 101 mounted upon the extreme ends of the rails 48 and 49 and so formed as to remove any material from the lateral exterior portions of the molds 62, which material may have overflowed the molds 62. Any suitable means, such as a conveyor belt or the like, may be employed to carry the molds away from the machine after having passed through the scrapers 100 and 101.

Since pastes or materials of various consistencies may be molded by a machine of this character, and since the viscosity of the materials will vary with their consistencies, it is desirable, and in fact essential, that a greater propelling action be exerted upon fluids whose consistency is thick than is necessary in the case of lighter pastes. Furthermore, it is evident that molds of different capacities may be operated upon and that it is necessary to cause a greater speed of flow of material through the nozzle 21 where the capacity of the molds is increased. Accordingly, we have provided a convenient means for increasing the propelling action of the conveyor screws 17 and 18 by increasing the speed thereof when pastes of heavy consistency are to be molded. In Figs. 3 and 4 are illustrated on a larger scale the speed-change mechanism so employed. The shaft 40 from which the conveyor screws 17 and 18 are driven (Fig. 2) has mounted upon it and rigidly secured thereto three gears 102, 103 and 104 of varying diameter and meshing respectively with the gears 106, 107 and 108, loosely mounted upon the shaft 38 which is driven from the main jack shaft 34 as hereinbefore described. The gears 106, 107 and 108 are provided with diametrically opposite key-ways as 106', 107' and 108', respectively, adapted to be engaged by a key 105 extending through oppositely disposed slots 105' in the shaft 38. The shaft 38 is hollow so as to receive a rod 109, to one end of which the key 105 is rigidly secured as by means of a set screw 110, so that axial movement of the rod 109, imparted thereto manually by means of the knob 111, is caused to move the key 105 axially along the slots 105' and into engagement with any one of the key-ways 106', 107' or 108' and their respective gears as desired. The shaft 38 is provided with a collar 112 having a radially extending opening therein in the inner extremity of which is mounted a small steel ball 113 forced inwardly by means of a spiral spring 114 held in position by means of the set screw 115. The ball 113 is adapted to engage suitable recesses as 106'', 107'' and 108'' in the rod 109 so as to positively hold the rod 109 and its key 105 in the adjusted position with respect to any one of the gears 106, 107 or 108, respectively. The gears 107 and 108 are counter-bored at 107$^a$ and 108$^a$ respectively throughout a sufficient extent in an axial direction to accommodate the key 105 within the respective counter-bore. In making a speed change, the key 105 first leaves the key-way 108', for example, and enters the counter-bore 108$^a$, thus disengaging the gear 108 from the driving shaft 38. Further motion of the key to the right under the action of the rod 109 causes it to enter the key-way 107' of the gear 107 to place the latter in driving connection with the shaft 38. It will be obvious that by this means either of the last mentioned gears may be placed in driving connection with the driving shaft 38 and that the speed of the shaft 40 and hence the speed of the conveyor screws 17 and 18, will be correspondingly varied in accordance with the particular gear manually selected. It will be understood that this invention contemplates a change in speed throughout a greater range than the three speed changes illustratively shown in Fig. 6 and hereinbefore described, and that a greater number of steps may be employed, if desired.

As hereinbefore described, two conveyor screws 17 and 18 are employed to exert a pressure in the material in the nozzle 21 that will be substantially uniformly distributed throughout the opening 80 thereof. It is to be understood that the disclosure of only two conveyor screws is merely illustrative and that this invention contemplates increasing the number of conveyor screws acting conjointly to an extent commensurate with the width of mold employed and hence with the width of the opening 80 of the nozzle 21. Thus, for example, where a greater width of mold is to be employed and where it is essential to maintain the pressure in the material uniform throughout the nozzle opening 80, a greater number than two conveyor screws may be employed.

It will be noted that there has been provided in this invention a molding machine of great flexibility of adjustment with respect to various sizes of molds, and with respect also to the varying propelling action required to operate effectively upon materials of varying viscosity. It will also be noted that the machine in this invention provides for an accurate and positive filling of the molds with great simplicity of action and without loss. It will also be noted that the several objects hereinbefore noted, as well as others in this invention, have been achieved.

It will be understood that the illustrative embodiment of the invention herein shown may be variously modified and that the invention may be variously embodied within the scope of the following claims:

We claim as our invention:

1. In a machine of the character described, in combination, a receptacle for receiving a moldable material, a nozzle provided with a discharge aperture associated with said receptacle, means for moving at a constant rate a succession of molds into operative relation with the discharge aperture of said nozzle, a plurality of propelling devices interposed between said receptacle and said discharge aperture adapted to exert a substantially uniform pressure in said material passing said aperture, and means for changing the effectiveness of said propelling devices to accommodate materials of varying consistency and independently of the constant rate of movement of said molds.

2. In a machine of the character described, in combination, a receptacle for receiving a plastic material, a nozzle associated therewith, means for moving a succession of molds into operative relation with said nozzle, means for forcing said material from said receptacle through said nozzle, and means moving continuously in a direction transverse the path of said molds for scraping surplus material from said filled molds.

3. In a machine of the character described, in combination, a receptacle for receiving a moldable material, a nozzle associated therewith, means for moving a succession of molds into operative relation with said nozzle, and a scraper moving continuously in a direction transverse the path of said molds and operating upon said filled molds to remove surplus material therefrom.

4. In a machine of the character described, in combination, a receptacle for receiving a plastic material, a nozzle associated therewith, means for moving a succession of molds into operative relation with said nozzle, and a continuously moving scraper having the form of an endless belt operating upon said molds after filling to remove the surplus material away from said molds, and a stationary scraper in contact with said moving scraper adapted to remove said surplus material therefrom.

5. In a machine of the character described, in combination, a receptacle for receiving a plastic material, a nozzle associated therewith, means for continuously moving a succession of molds into operative relation with said nozzle to be filled thereby, means for forcing said material from said receptacle into said nozzle, and a continuously moving endless belt scraper making an angle with the path of movement of said molds for limiting the height to which said molds are filled above the walls thereof by said nozzle, said scraper moving and conveying said material away from said molds, and a stationary scraper in contact with said moving scraper adapted to remove said surplus material therefrom.

6. In a machine of the character described, in combination, a receptacle for receiving a plastic material, a nozzle associated with said receptacle, means for continuously moving a succession of molds, whose receiving capacity may vary, into operative relation with said nozzle, a plurality of propelling devices interposed between said receptacle and said nozzle adapted to produce a substantially uniform pressure throughout the material within said nozzle, and means for varying the speed of said propelling devices in accordance with the varying receiving capacities of said molds and independently of the continuous movement of said molds.

7. In a machine of the character described, in combination, a receptacle for receiving a plastic material, a nozzle associated therewith, means for moving a succession of molds into operative relation with said nozzle, means for forcing said material from said receptacle through said nozzle, continuously moving means having the form of an endless belt operating upon said molds after filling to remove the surplus material away from said molds, and a stationary bracing member in proximity to the lower scraping edge of said last mentioned means for restricting said scraping edge to a predetermined path.

8. In a machine of the character described, in combination, a receptacle for receiving a plastic material, a nozzle associated therewith, means for moving a succession of molds into operative relation with said nozzle, means for forcing said material from said receptacle through said nozzle, a continuously moving scraper having the form of an endless belt operating upon said molds after filling to remove the surplus material from said molds, adjustable means for restricting the movement of the scraping edge of said last mentioned means to a predetermined path, and means for adjusting the height of said scraping edge above the top edges of said molds.

9. In a machine of the character described, in combination, a receptacle for receiving a plastic material, a nozzle associated therewith, means for moving a succession of molds into operative relation with said nozzle, means for forcing said material from said receptacle through said nozzle, a continuously moving scraper having the form of an endless belt operating upon said molds after filling to remove the surplus material from said molds, and means for varying the inclination to the vertical of the scraping edge of said last mentioned means.

10. In a machine of the character described, in combination, a receptacle for receiving a moldable material, a nozzle associated therewith, means for forcing said material from said receptacle into said nozzle, a pair of guide rails in proximity to said nozzle adapted to guide a succession of molds into operative relation to said nozzle, means for moving said molds along said guide rails, means for relatively adjusting said guide rails to accommodate various widths of molds, a pair of slidable plates, one at each side of the aperture of said nozzle, and means connecting each of said plates with one of said guide rails whereby the width of the aperture of said nozzle is adjusted simultaneously with the adjustment of said guide rails to accommodate various widths of molds.

11. In a machine of the character described, in combination, a receptacle for receiving a plastic material, a nozzle associated therewith, means for moving a succession of molds into operative relation with said nozzle and a scraper located in the path of said molds and having an element moving continuously across the path of said mold in one direction to convey the excess material away from said molds.

12. In a machine of the character described, in combination, a receptacle for receiving a plastic material, a nozzle associated therewith, means for moving a succession of molds into operative relation with said nozzle and a scraper located in the path of said molds and having a rigid element fixed adjacent the path of said molds and a flexible element movable transversely of the path of said molds to convey excess material away from the molds.

In testimony whereof, we have signed our names to this specification, this 4th day of December, 1920, and this 4th day of December, 1920, respectively.

PAUL G. HOLLSTEIN.
EMIL V. RAUE.